Feb. 1, 1927.

J. D. JOHNSON

DISK CULTIVATOR

Filed Jan. 4, 1922

Inventor
Joseph D. Johnson

By

Attorney

Patented Feb. 1, 1927.

1,616,318

UNITED STATES PATENT OFFICE.

JOSEPH D. JOHNSON, OF LEOLA, SOUTH DAKOTA.

DISK CULTIVATOR.

Application filed January 4, 1922. Serial No. 526,944.

This invention relates to raising and lowering devices and its particular application is to the beam which carries the disks of a cultivator.

One object of the invention is to provide a device of this character which includes means for raising and lowering the rear end of the disk beam independently of the other end, and also means for cooperation with the first means to raise the other end simultaneously with the first end.

Other objects and advantages will be apparent from the following description when taken in connection with the accompanying drawing.

Figure 1:
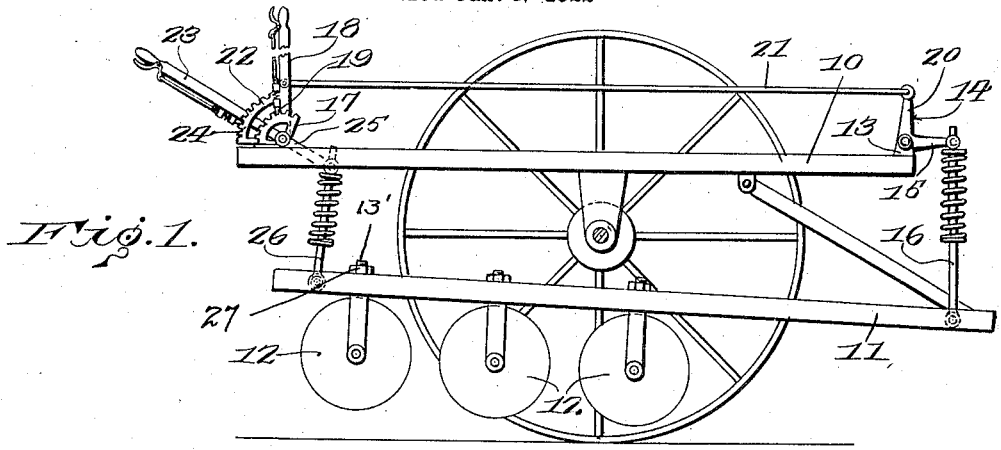
Figure 1 is a side elevation of a portion of a cultivator showing the invention applied thereto and showing the operation of the device when the rear end of the beam has been lifted.
Figure 2:
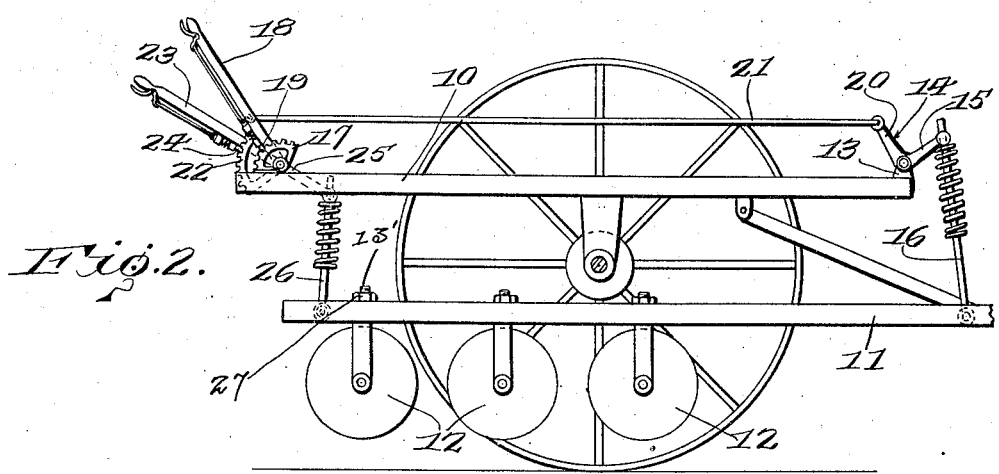
Figure 2 is a similar view, showing both ends of the beam raised.
Figure 3:
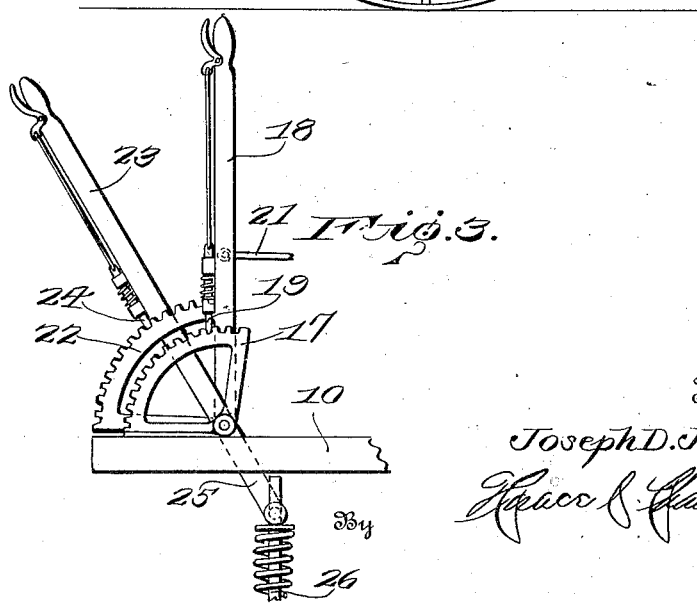
Figure 3 is an enlarged view of the lifting levers in normal position with the beam lowered.

Referring particularly to the accompanying drawing, 10 represents the main frame of a cultivator below which is disposed the beam 11 carrying the disks 12. Pivotally mounted on a bracket 13 on the forward end of the frame 10 is a bell crank lever 14, the horizontal arm 15 of which is connected with the forward end of the beam 11 by the vertical spring rod 16.

Secured on the rear end of the frame 10 is a rack segment 17, and pivotally connected with this segment is the operating lever 18. The lever carries a pawl 19 for engagement with the teeth of the segment. Connecting this lever 18 with the other arm 20 of the bell crank 14 is a longitudinally extending link 21. Formed integrally with the lower portion of the lever 18 and extending rearwardly therefrom is a rack segment 22, the same being movable with the lever. Pivotally mounted on the same pivot as that of the lever 18 is a second lever 23, the same having a pawl 24 for engagement with the teeth of the segment 22. Below the pivot of the lever 23, there is formed an extension, on said lever, shown at 25, and this extension is connected with the rear of the beam 11 by the vertical spring rod 26.

When it is desired to raise the rear end of the beam only, the lever 23 is pulled rearwardly which acts on the rod 26 through the extension 25, the pawl 24 being properly engaged and disengaged with respect to the segment 22. When it is desired to raise both ends of the beam at the same time, the lever 18 is moved rearwardly and by reason of the fact that the pawl 24 engages with the teeth of this segment 22, the lever 23 will be moved rearwardly with the segment. This movement of the lever 18 through the link 21, rocks the bell crank 14 so as to lift the front end of the beam.

In either case, only one lever need be moved to accomplish a desired result, the lever 23 being moved to raise the rear end of the beam, while the lever 18 is moved to cause the raising of both ends.

Each of the disks 12 has a vertical pintle 13' which extends upwardly through the bar or beam 11, and each pintle has a clamping nut thereon, so that the disks may be removed and replaced by other ground treating devices, or the number of such devices used varied at the will of the owner, and in accordance with the conditions.

What is claimed is:

A disk cultivator including a wheel carried frame, a disk carried beam arranged beneath the frame, a bell crank lever mounted at one end of the frame, a rod connecting the bell crank lever with the beam, a segment mounted on the frame, an operating lever pivoted adjacent the segment and having locking means in engagement therewith, a link connecting said lever with the bell crank lever, a second segment mounted on the frame, a second operating lever pivoted adjacent said second segment and having rocking means in engagement therewith, and a rod connecting said second lever with said beam, the latter being movable toward and away from the frame upon manipulation of said operating levers.

In testimony whereof, I affix my signature.

JOSEPH D. JOHNSON.